US010383037B1

(12) United States Patent
Patwardhan et al.

(10) Patent No.: US 10,383,037 B1
(45) Date of Patent: Aug. 13, 2019

(54) TRANSMITTING TRAFFIC FROM BLUETOOTH LOW ENERGY CLIENTS ASSOCIATED WITH DIFFERENT UNIVERSALLY UNIQUE IDENTIFIERS (71) Applicant: Hewlett Packard Enterprise Development LP, Houston, TX (US)

(72) Inventors: Gaurav Patwardhan, Santa Clara, CA (US); Ankur Kamthe, Santa Clara, CA (US); Shruthi Koundinya, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/965,616

(22) Filed: Apr. 27, 2018

(51) Int. Cl.
H04W 48/10 (2009.01)
H04W 48/16 (2009.01)
H04W 84/12 (2009.01)

(52) U.S. Cl.
CPC .......... *H04W 48/10* (2013.01); *H04W 48/16* (2013.01); *H04W 84/12* (2013.01)

(58) Field of Classification Search
CPC ..... H04W 48/10; H04W 48/16; H04W 84/12; H04W 40/244; H04W 4/80
See application file for complete search history.

(56) References Cited

U.S. PATENT DOCUMENTS

| 9,420,423 | B1* | 8/2016 | Mendelson | ............ H04W 4/90 |
| 9,426,615 | B2 | 8/2016 | Vigier et al. | |
| 9,491,691 | B2 | 11/2016 | Tailor et al. | |
| 9,622,046 | B2* | 4/2017 | Otis | ...................... H04W 4/043 |
| 9,642,167 | B1* | 5/2017 | Snyder | ................. H04W 4/021 |
| 2016/0093127 | A1 | 3/2016 | Evans | |
| 2016/0094952 | A1 | 3/2016 | Mosher et al. | |

OTHER PUBLICATIONS

Bluetooth Low Energy (BLE) (Research Paper), Retrieved Aug. 25, 2017, 4 Pgs.

* cited by examiner

*Primary Examiner* — Julio R Perez
(74) *Attorney, Agent, or Firm* — Hewlett Packard Enterprise Patent Department (57) ABSTRACT

Example method includes: reporting, by a network device, a detection of a Bluetooth Low Energy (BLE) beacon message from a first BLE device deployed in a wireless local area network (WLAN) serving a plurality of tenants; receiving, by the network device, information about a first tenant assigned to the first BLE device from a server; determining, by the network device, a first universally unique identifier (UUID) uniquely corresponding to the first tenant; and configuring, by the network device, the first BLE device to broadcast a first plurality of BLE beacon messages using the first UUID, wherein a second and different BLE device deployed in the WLAN is configured to broadcast a second plurality of BLE beacon messages using a second UUID that is different from the first UUID, the second UUID uniquely corresponding to a second tenant different from the first tenant in the plurality of tenants.

18 Claims, 6 Drawing Sheets

TRANSMITTING TRAFFIC FROM BLUETOOTH LOW ENERGY CLIENTS ASSOCIATED WITH DIFFERENT UNIVERSALLY UNIQUE IDENTIFIERS

BACKGROUND

MultiZone generally refers to a wireless local area network (WLAN) feature that allows management and data traffic to be separated between different zones that are served by the same access point (AP). Each zone can correspond to a unique tenant that may contract with a WLAN vendor to provide WLAN services to its clients. Traffic in different zones can be tunneled to different network controllers over the same AP. When the AP deployed in a multi-tenant environment also communicates with Bluetooth Low Energy (BLE) devices, those BLE devices currently are associated to a location in which they are deployed, rather than to a tenant which uses them. Therefore, every tenant in the same location needs to deploy its own BLE devices.

BRIEF DESCRIPTION OF THE DRAWINGS

The following detailed description references the drawings, wherein.

DETAILED DESCRIPTION

MultiZone generally refers to a WLAN feature that allows organizations to have multiple and separate secure networks while using the same AP. As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. For example, a "network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information. In some implementations, a network device may refer to an access point acting as a virtual master network controller among a cluster of access points.

Conventionally, to have multiple secure networks in a single physical location, multiple APs were deployed to serve the multiple secure networks, which creates radio frequency (RF) interference that negatively impair network performance and increase the cost to the organizations. With MultiZone feature enabled, a single AP can include at least two virtual access points (VAPs) to communicate with at least two different network controllers using at least two different service set identifiers (SSIDs). A VAP may generally refer to any logical entity that resides within a physical access point, which appears to a client device as an independent access point with its own unique SSID. The data is encrypted from client devices in the at least two secure networks corresponding to the at least two SSIDs to the at least two network controllers. When the data is transmitted from the client devices through the single AP in the at least two secure networks, the data is still encrypted. Therefore, the networks are completely separate and secure for different client devices in the different networks corresponding to the different SSIDs even though the data traffic corresponding to the different networks is transmitted through the same AP.

Moreover, an AP may have multiple radios. One of these radios may be an integrated BLE radio. BLE generally refers to an enhancement to the Bluetooth standard (e.g., as specified by the Bluetooth Special Interest Group (SIG) standards), which allows for the wireless protocol to be applied with energy saving techniques that reduce power consumption. BLE radios may communicate with client devices via beacons, which can be BLE messages transmitted or heard by BLE-compatible devices. The BLE device could be a computer, a phone, a wireless AP, a tag, or any similar devices. The BLE beacon message may have a few basic components, including but not limited to, a Universally Unique Identifier (UUID), a Major value, a Minor value, etc. These components of the BLE beacon can be configured with information the operator wants to communicate to other BLE-compatible devices. In an example retail WLAN environment, the BLE beacon components may be interpreted as the followings: Retail Brand (UUID); Shop Location (Major); and Product Category (Minor). In general, in a WLAN environment with multiple tenants, each tenant may be associated with a unique UUID.

As used herein, a beacon sensor device (also referred to as "BLE device" or "BLE-compliant device") may refer to any type of device capable of transmitting and receiving advertisements and responses. That is, a BLE-compliant device may be able to act in a limited role. For example, a BLE-compliant device may behave as a broadcaster, or as a non-connectable advertiser. As used herein, a broadcaster may refer to a beacon sensor device that is able to send advertisements but is not able to initiate or facilitate connections between itself and a network device. A BLE-compliant device may behave as an observer. As used herein, an observer may refer to a beacon sensor device that able to scan for advertisements but is unable to initiate or facilitate connections between itself and a network device. A BLE-compliant device may behave as a peripheral device. As used herein, a peripheral device may refer to a beacon sensor device that transmits advertisements and is able to facilitate connections between itself and a network device. A BLE-compliant device operating as a peripheral device may operate as a slave in a single link-layer connection. Finally, a BLE-compliant device may behave as a central device. As used herein, a central device may refer to a beacon sensor device that is able to both scan for advertisements and initiate connections. Additionally, a BLE-compliant device behaving as a central device may operate as a master in either a single or a multiple link-layer connection.

A BLE device according to the present disclosure may behave as multiple BLE devices. In some examples, the BLE device may behave as multiple beacon sensor devices operating in peripheral mode, which allows the BLE device to advertise multiple UUIDs and facilitate connections to the BLE device via the multiple UUIDs. As previously mentioned, each UUID may correspond to a unique tenant in a multi-tenant WLAN networking environment. Moreover, a BLE device may behave as multiple beacon sensor devices using different advertisement data frame formats. In some examples, the beacon sensor device may cycle through each of the formats, thus allowing regular transmission of each format of advertisement data frame.

According to examples of the present disclosure, multiple UUIDs broadcasted by the BLE devices deployed in a multi-tenant WLAN networking environment are mapped uniquely with a plurality of virtual access points (VAPs) that are configured on a single AP. Thus, the single AP communicating with multiple network controllers in the multi-tenant WLAN networking environment can transmit tenant-specific BLE beacon data to the particular network controller corresponding to the tenant over a secure tunnel that is established between the VAP and the particular network controller.

Figure 1A:
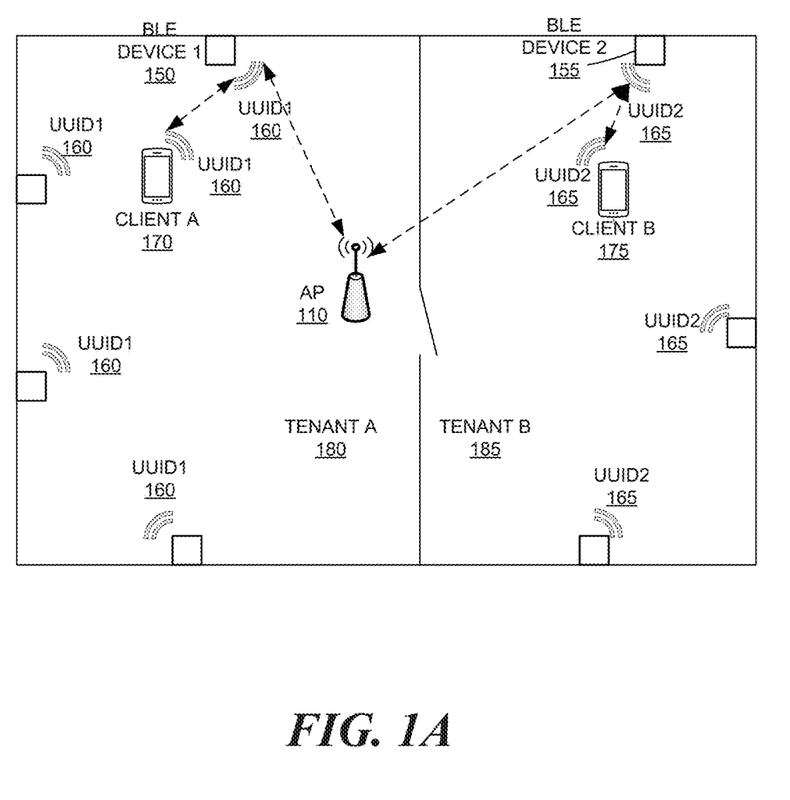
FIG. 1A-1B are block diagrams of an example networking environment with multiple BLE devices deployed to serve multiple tenants by a single access point.
Figure 1B:
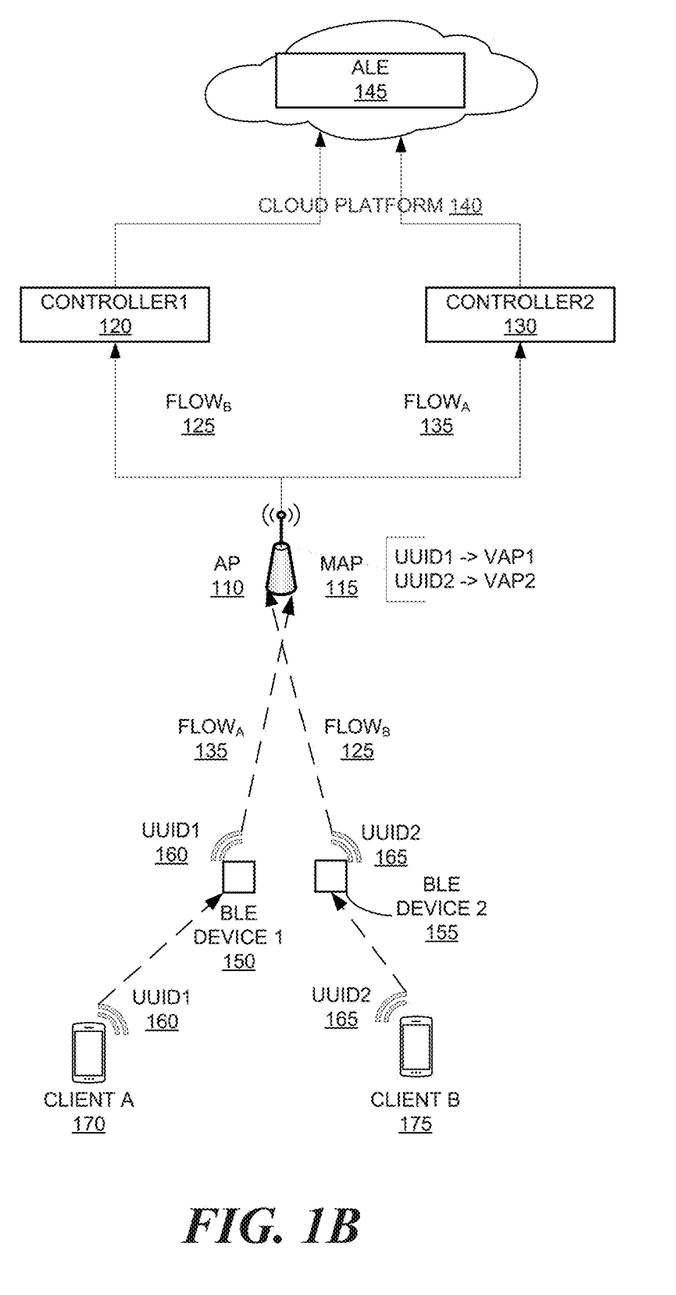

FIGS. 1A-1B illustrate one example of networking environment with multiple BLE devices deployed to serve multiple tenants by a single access point. Specifically, FIG. 1A shows a floor plan that includes at least an access point AP 110 deployed in a multi-tenant WLAN networking environment serving two distinct tenants, such as Tenant A 180 and Tenant B 185. AP 110 includes at least one BLE radio that is capable of communicating with BLE-compliance devices using Bluetooth wireless communication protocols. In this example, Tenant A 180 and Tenant B 185 may occupy different geographical areas on the floor plan. Each geographical area can have multiple BLE devices deployed. For example, a first plurality of BLE devices, including BLE Device 1 150, may be deployed in a first geographical area that correspond to Tenant A 180. Each of the first plurality of BLE devices may broadcast BLE beacon messages that include UUID1 160. On the other hand, a second plurality of BLE devices, including BLE Device 2 155, may be deployed in a second geographical area that correspond to Tenant B 185. Each of the second plurality of BLE devices may broadcast BLE beacon messages that include UUID2 165.

For ease of illustration, assuming that Client A 170 overhears the beacon sent by BLE Device 1 150 that advertises UUID1 160. BLE Device 1 150 is capable of being connected to the BLE radio of AP 110 using a Bluetooth wireless communication protocol and/or a Wi-Fi radio of AP 110 using a wireless communication protocol compliant with IEEE 802.11 standards. Furthermore, assuming that Client B 175 has established a Bluetooth connection to BLE Device 2 155 that advertises UUID2 165. BLE Device 2 155 is also capable of being connected to the BLE radio of AP 110 using the Bluetooth wireless communication protocol.

Referring now to FIG. 1B that illustrates how the example system herein transmits traffic from BLE clients associated with different universally unique identifiers (UUIDs) on separate secure networks through a single access point. To achieve this, the example system may perform the followings: (1) setting up a BLE device; (2) relaying information between the BLE devices to management devices, e.g., in a cloud infrastructure, by a single AP; and (3) looking up client device's information including its geographical positions.

First, a BLE device (e.g., BLE Device 1 150) may boot up and start advertising BLE beacons using its default UUID. When an AP (e.g., AP 110) that is physically located in proximity to the BLE device receives the BLE beacon messages on its BLE radio, the AP (e.g., AP 110) may configure the BLE device with one or more UUIDs. Each UUID may correspond to a unique VAP configured on the AP. Each VAP on the AP corresponds to a unique tenant in a multi-tenant WLAN networking environment.

To determine which UUIDs to configure on the BLE device, the AP may relay information between the BLE devices to management devices in a cloud infrastructure. For example, the AP may report the beacon messages it receives from the BLE device to an analytics and location engine (ALE) server residing in a cloud infrastructure. The ALE may collect presence data, including but not limited to, real-time client locations, traffic flow, dwell time, zone analytics, etc., about WLAN-enabled client devices and/or BLE devices while protecting personal privacy. This data is then integrated with third-party analytics that translate it into actionable business intelligence. Although in this example, the ALE server resides in a cloud infrastructure, the ALE server may be deployed in the WLAN environment, e.g., at a central campus, or any other alternative deployments.

Subsequently, the BLE device transmitting beacon messages including the default UUIDs is placed on a floor map (e.g., as illustrated in FIG. 1A by the ALE server in the cloud infrastructure. Based on the location of the BLE device determined by the ALE server, the BLE device is assigned to one or more tenants by the ALE server in the cloud architecture. The tenant assignment information may be transmitted to the AP. The AP may have multiple VAPs configured with a unique UUID mapped to each VAP, whereby each VAP also uniquely corresponds to a particular tenant. Upon receiving the tenant assignment information associated with the BLE device, the AP can enable the VAPs associated with the one or more tenants assigned to the BLE device to create a secure tunnel between the AP and a tenant-specific network controller. Note that multiple VAPs may be enabled on the AP depending on the number of tenants and their SLAs in the multi-tenant WLAN networking environment. Also, the AP may report additional BLE devices from which it receives BLE beacon messages to the ALE server in the cloud infrastructure through established secure tunnels. Furthermore, the AP can configure the BLE device with the UUID(s) mapped to the VAP(s) based on the received tenant assignment information. The BLE device may then advertise the configured UUID(s) corresponding to the assigned tenant(s) instead of the default UUID preconfigured by a manufacture of the BLE device.

A BLE-enabled client device may join the multi-tenant WLAN networking environment, and receive one or more BLE beacon messages from one or more BLE devices deployed in the multi-tenant WLAN networking environment. Further, the client device may be installed with a mobile application. The mobile application may report the UUIDs in the BLE beacon messages the client device receives, and select a tenant from a plurality of tenants in the multi-tenant WLAN networking environment. Based on the tenant selected by the client device, the ALE server in the cloud infrastructure may locate the client device, and identify a plurality of BLE devices that broadcast the UUID corresponding to the selected tenant. In some examples, the mobile application may request a location of the client device, and the ALE server may transmit a response including the location upon identifying the plurality of BLE devices that broadcast the UUID of the selected tenant. In some examples, if the client is located out of boundary of a region associated with the selected tenant on the floor plan, the mobile application may issue an error or warning to alert a user of the client device.

In the example illustrated in FIG. 1B, when a BLE device (e.g., BLE Device 1 150) boots up in the multi-tenant WLAN networking environment, the BLE device may start transmitting BLE beacon messages using a default UUID pre-configured by a manufacture. Then, AP 110 may receive the BLE beacon messages transmitted by BLE Device 1 150 on its BLE radio. Thereafter, AP 110 may report the BLE beacon messages it receives from BLE Device 1 150 to an ALE server 145 in cloud platform 140. ALE server 145 may determine the location of BLE Device 1 150 based on the BLE beacon messages and a pre-configured floor map that is accessible by ALE server 145. Next, ALE server 145 may assign BLE Device 1 150 to Tenant A 180 based on the determined location of BLE Device 1 150. Similarly, AP 110 may detect BLE beacon messages transmitted by BLE Device 2 155 and report them to ALE server 145. ALE server 145 may assign BLE Device 2 155 to Tenant B 185 based on the determined location of BLE Device 2 155. ALE server 145 can then transmit this tenant assignment information to AP 110.

AP 110 may maintain a map 115 either internally in its memory or externally on a separate storage. Map 115 can store a mapping between (a) a plurality of UUIDs that are configured for beacon messages transmitted by the BLE radio of AP 110 and (b) a plurality of VAPs that are configured on AP 110. Each VAP may be uniquely associated with a tenant in a multi-tenant WLAN networking environment. For example, VAP1 advertising SSID1 on the Wi-Fi radios of AP 110 may be associated with Tenant A 180, and VAP2 advertising SSID2 on the Wi-Fi radios of AP 110 may be associated with Tenant B 185.

Based on the tenant assignment information received from ALE server 145, AP 110 may select a particular VAP (e.g., VAP1) corresponding to Tenant A 180 for communication with BLE Device 1 150. Then, AP 110 can look up a UUID (e.g., UUID1 160) corresponding to the particular VAP from map 115. Moreover, AP 110 can configure BLE Device 1 150 with UUID1 160 based on the map lookup results. Likewise, AP 110 can further configure BLE Device 2 155 corresponding to VAP2 with UUID2 165 based on the map lookup results. Subsequently, BLE Device 1 150 may start broadcasting BLE beacon messages including UUID1 160, and BLE Device 2 155 may start broadcasting BLE beacon messages including UUID2 165.

Furthermore, a separate network controller may be identified for each tenant. In the example in FIG. 1B, Controller2 130 may correspond to Tenant A 180, whereas Controller1 120 may correspond to Tenant B 185. Also, AP 110 can establish a separate secure tunnel with each identified network controller.

In addition, there may be multiple BLE-enabled client devices, such as Client A 170 and Client B 175, in the multi-tenant WLAN networking environment. In this example, Client A 170 receives BLE beacon messages with UUID1 160 from BLE Device 1 150. Likewise, Client B 175 receives BLE beacon messages with UUID2 165 from BLE Device 2 155.

When AP 110 receives traffic flow, such as $Flow_A$ 135, originated from Client A 170 where the traffic may contain the beacon information about BLE devices including but not limited to BLE Device 1 150, AP 110 can forward $Flow_A$ 135 to Controller2 130 via a first established secure tunnel. Note that Client A 170 and BLE Device 1 150 communicate with each other using beacon messages that include UUID1 160, which is unique to Tenant A 180, and that Controller2 130 is assigned in the WLAN to manage network traffic for Tenant A 180.

Similarly, when AP 110 receives traffic flow, such as $Flow_B$ 125, originated from Client B 175 where the traffic may contain the beacon information about BLE devices including but not limited to BLE Device 2 155, AP 110 can forward $Flow_B$ 125 to Controller1 120 via a second established secure tunnel. Note that Client B 175 and BLE Device 2 155 communicate with each other using beacon messages that include UUID2 165, which is unique to Tenant B 185, and that Controller1 120 is assigned in the WLAN to manage network traffic for Tenant B 185. Both Controller1 120 and Controller2 130 may communicate with cloud platform 140, including ALE server 145, in order to provide various network services to the client devices that are connected to each tenant's separate and secure network.

Note that although one UUID is configured on the BLE device in this example, multiple UUIDs can be configured on the BLE device as shown in other examples illustrated in later sections. Depending on the service model, the Service Level Agreement (SLA), one tenant (e.g., Tenant A 180) can have more BLE devices configured than another tenant (e.g., Tenant B 185) in the multi-tenant WLAN networking environment. For example, the SLA between an IT organization and Tenant A 180 may specify a higher location accuracy level than the SLA between the IT organization and Tenant B 185. Therefore, more BLE devices deployed in the multi-tenant WLAN networking environment may be configured for the UUID uniquely associated with VAP1, i.e., the VAP corresponding to Tenant A 180, to provide enhanced location accuracy per the SLA between the IT organization and Tenant A 180.

In some examples, a plurality of BLE devices located in a particular geographical region may be configured with a particular UUID that is associated with a particular VAP for a particular tenant. The geographical regions corresponding to the different UUIDs assigned to different tenants may not overlap with each other. However, in other examples, the geographical regions corresponding to the different UUIDs assigned to the different tenants may have overlapping regions. In some examples, the geographical region corresponding to one UUID assigned to one tenant may be within the boundary of the geographical region corresponding to another UUID assigned to another tenant. In the example illustrated in FIG. 1A, the geographical region to the left side of the floor plan may correspond to UUID1 160 that is associated with Tenant A 180, whereas the geographical region to the right side of the floor plan may correspond to UUID2 165 that is associated with Tenant B 185.

Figure 2A:
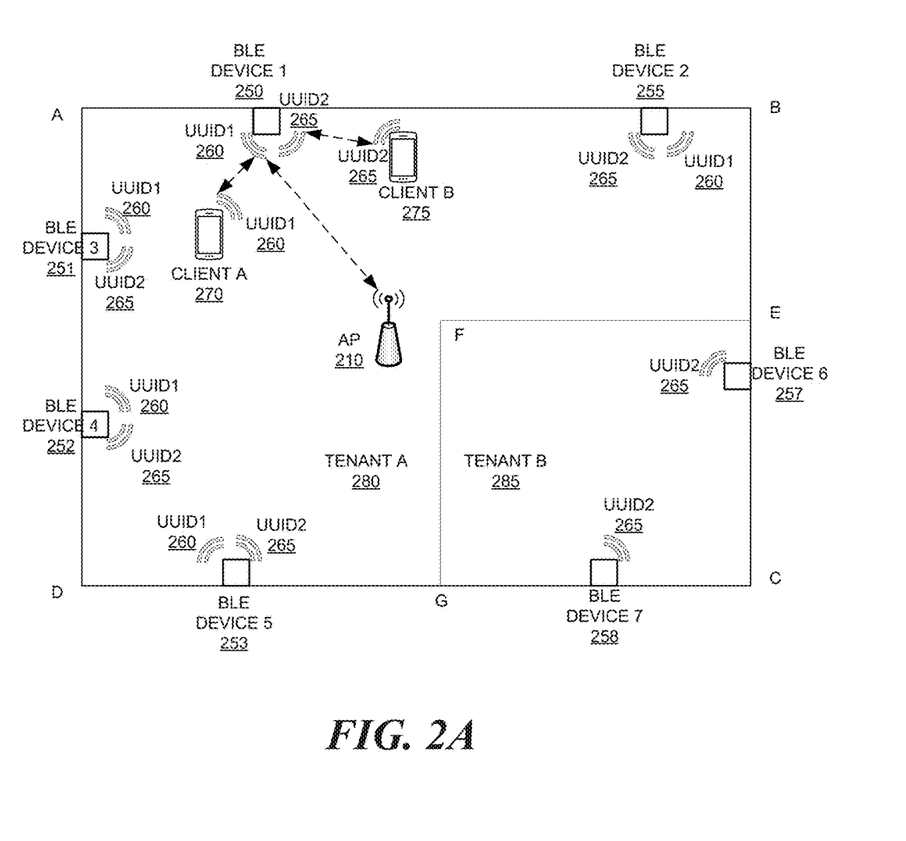
FIG. 2A-2B are block diagrams of an example networking environment with multiple BLE devices deployed to serve multiple tenants by a single access point.
Figure 2B:
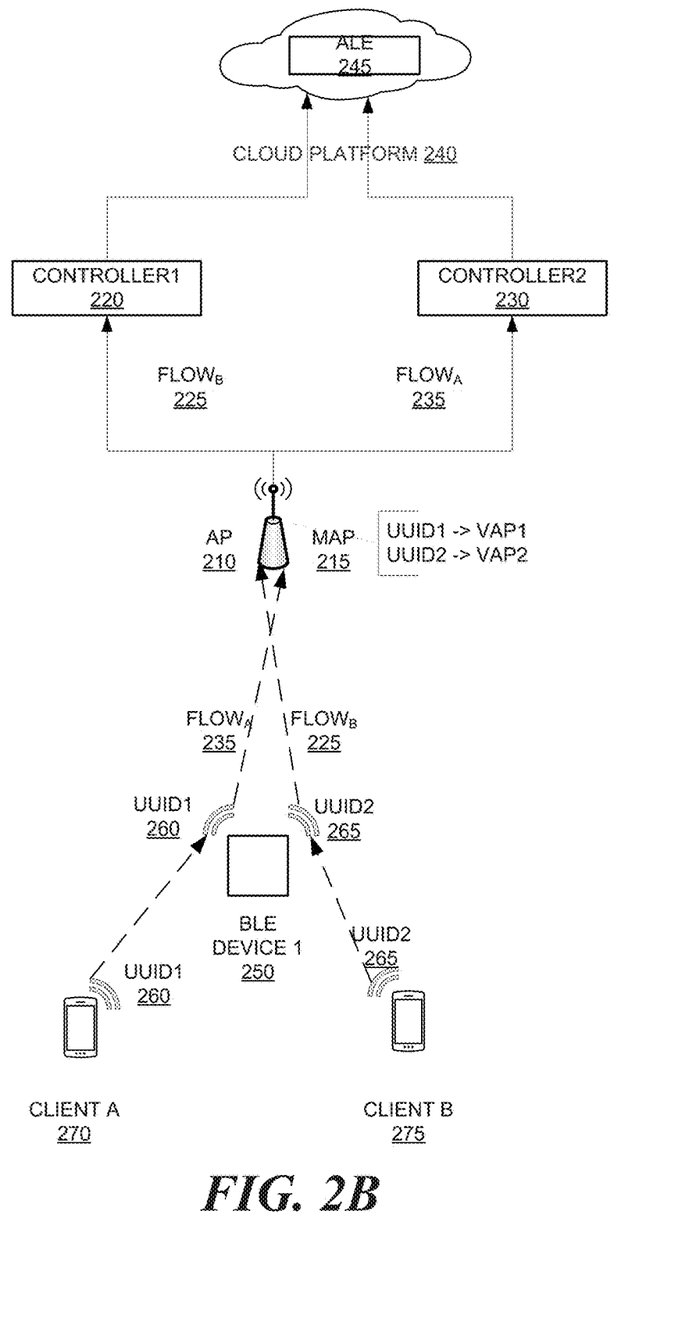

FIGS. 2A-2B illustrate another example networking environment with multiple BLE devices deployed to serve multiple tenants by a single access point. Like in FIGS. 1A-1B, FIGS. 2A-2B includes at least a BLE-enabled access point AP 210 deployed in a multi-tenant WLAN networking environment serving two distinct tenants, such as Tenant A 280 and Tenant B 285. However, in this example, Tenant A 280 and Tenant B 285 may occupy overlapping geographical areas on the floor plan. For example, the geographical area enclosed by ABCD may be associated with Tenant B 285, whereas the geographical area enclosed by ABEFGD may be associated with Tenant A 280. A first set of BLE devices in the network, including BLE Device 1 250, BLE Device 2 255, BLE Device 3 251, BLE Device 4 252, and BLE Device 5 253, may be deployed in a first geographical area (e.g., ABEFGD) that corresponds to Tenant A 280. A second set of BLE devices in the network, including BLE Device 1 250 to BLE Device 7 258, may be deployed in a second geographical area (e.g., ABCD) that corresponds to Tenant B 285. Because the first geographical area ABEFGD and the second geographical area ABCD overlap with each other, one or more BLE devices may broadcast a plurality of UUIDs that correspond to a plurality of VAPs assigned to different tenants. For example, within the overlapped region ABEGFD, each of BLE Device 1 250, BLE Device 2 255, BLE Device 3 251, BLE Device 4 252, and BLE Device 5 253 may broadcast at least one beacon message including UUID1 260 and at least one beacon message including UUID2 265. In some examples, a BLE device may broadcast beacon messages including UUID1 260 during a first period of time and beacon messages including UUID2 265 during a second and different period of time. In some examples, the BLE device may broadcast a first beacon message including UUID1 260 and a second beacon message including UUID2 265 simultaneously. In the example illustrated in FIG. 2A, because BLE Device 6 257 and BLE Device 7 258 are located inside the second geographical region (e.g., ABCD) but not the first geographical region (e.g., ABEFGD), BLE Device 6 257 and BLE Device 7 258 may broadcast beacon messages including UUID2 265 but not UUID1 260.

FIG. 2B illustrates how the example system herein transmits traffic from BLE-enabled client devices associated with different UUIDs on separate secure networks through a single access point. In this example, when a BLE device (e.g., BLE Device 1 250) boots up in the multi-tenant WLAN networking environment, AP 210 receives beacon messages transmitted by BLE Device 250 and reports to ALE server 245 in cloud platform 240. ALE server 245 may look up a location of BLE Device 250 on a pre-configured floor map, determine a tenant assignment for BLE Device 250, and transmit the tenant assignment for BLE Device 250 to AP 210. In this example, BLE Device 250 is assigned to both Tenant A 280 and Tenant B 285 because it is located within the overlapping region of the two tenants.

Then, based on the tenant assignment, BLE device 250 may be configured with two UUIDs (e.g., UUID1 260 and UUID2 265) by AP 210 following the process previously described in relation to FIG. 1B. Here, UUID1 260 corresponds to Tenant A 280 and UUID2 265 corresponds to Tenant B 285.

AP 210 may further select VAP1 assigned to Tenant A 280 (which corresponds to UUID1 260) for transmitting traffic flows to and from Client A 270, and VAP 2 assigned to Tenant B 285 (which corresponds to UUID2 265) for transmitting traffic flows to and from Client B 275. In some examples AP 210 may look up the UUID corresponding to a particular VAP from a MAP 215. Furthermore, Controller2 230 may be assigned to manage network traffic for Tenant A 280, whereas Controller1 220 may be assigned to manage network traffic for Tenant B 285. AP 210 can establish a separate secure tunnel with each of Controller1 220 and Controller2 230.

Unlike in FIGS. 1A-1B, in this example, multiple BLE-enabled client devices in the multi-tenant WLAN networking environment may be associated with different tenant-specific networks. For example, Client A 270 may be associated with a first secure network of Tenant A 280, and Client B 275 may be associated with a second secure network of Tenant B 285. Furthermore, both Client A 270 and Client B 275 may communicate with the same BLE Device 1 250 via the Bluetooth wireless communication protocol. However, Client A 270 may transmit and/or receive BLE beacon messages with UUID1 260 to and from BLE Device 1 250, whereas Client B 275 may transmit and/or receive BLE beacon messages with UUID2 265 from BLE Device 1 150.

When AP 210 receives $Flow_A$ 235, originated from Client A 270 connected to BLE Device 1 250 via UUID1 260, AP 210 can forward $Flow_A$ 235 to Controller2 230 via a first established secure tunnel. Similarly, when AP 210 receives $Flow_B$ 225, originated from Client B 275 connected to BLE Device 1 250 via UUID2 265, AP 210 can forward $Flow_B$ 225 to Controller1 220 via a second established secure tunnel.

Both Controller1 220 and Controller2 230 may communicate with cloud platform 240, including ALE server 245, in order to provide various network services to the client devices that are connected to each tenant's separate and secure network.

In some examples, certain network services may be provided in one geographical region associated with one tenant but not another. For example, the multi-tenant WLAN networking environment may provide location tracking information for a first set of client devices located within a first geographical region and connected to a first secure network managed by a first network controller assigned to a first tenant. Meanwhile, location tracking information may not be provided to a second and different set of client devices located within a second geographical region and connected to a second and different secure network managed by a second network controller and different assigned to a and different second tenant. Note that the second geographical region may be the same as or different from the first geographical region. Moreover, the second geographical region may or may not overlap with the first geographical region. In addition, the second geographical region may be a portion of the first geographical region.

In some examples, the example system may increase or decrease a service level (e.g., stop location tracking) when client devices are located within a region with an arbitrary boundary that may correspond a region with heightened security. The system may do so by associated a plurality of BLE devices located within the arbitrary boundary on the floor map with a unique tenant identifier by ALE server 245, assign a separate UUID to those identified plurality of BLE devices located within the arbitrary boundary, and manage traffic associated with the separate UUID by particular network controller. The particular network controller may apply heightened security policies to the traffic transmitted to and from client devices communicatively coupled to the plurality of BLE devices.

In some examples, when a security threat is detected in a particular secure network managed by a particular network controller that is associated with a particular tenant, the example system may stop certain BLE devices from broadcasting beacon messages containing the UUID associated with the tenant, thereby shutting down the BLE network associated with the tenant exposed to the security threat. In the example illustrated in FIG. 2A, assuming that a security threat is detected by Controller2 230 associated with Tenant A 280, AP 210 may configure BLE Device 1 250, BLE Device 2 255, BLE Device 3 251, BLE Device 4 252, and BLE Device 5 253 to stop broadcasting BLE beacon messages with UUID1 260. Meanwhile, all BLE devices in FIG. 2A may continue broadcasting BLE beacon messages with UUID2 265.

In some examples, a new tenant may be configured over an existing floor plan dynamically without shutting down any existing secure networks. For example, a new VAP (e.g., VAP3) may be later configured on AP 210. A mapping between VAP3 and UUID3 may be added to map 215. Moreover, a network administrator may assign a new geographical region to be associated with the new tenant. For example, in FIG. 2A, the new geographical region may include BLE Device 1 250, BLE Device 2 255, BLE Device 6 257. Accordingly, upon the addition of the new tenant, AP 210 may configure BLE Device 1 250 and BLE Device 2 255 to broadcast at least a BLE beacon message with UUID1 260, a BLE beacon message with UUID2 265, and a BLE beacon message with UUID3. Further, upon the addition of the new tenant, AP 210 may configure BLE Device 6 257 to broadcast at least a BLE beacon message with UUID2 265, and a BLE beacon message with UUID3. Other BLE devices in the network do not change their operations. Thus, BLE Device 3 251, BLE Device 4 252, and BLE Device 5 253 keep broadcasting at least a BLE beacon message with UUID1 260 and a BLE beacon message with UUID2 265. Likewise, BLE Device 7 258 keeps broadcasting BLE beacon messages with UUID2 265.

Figure 3:
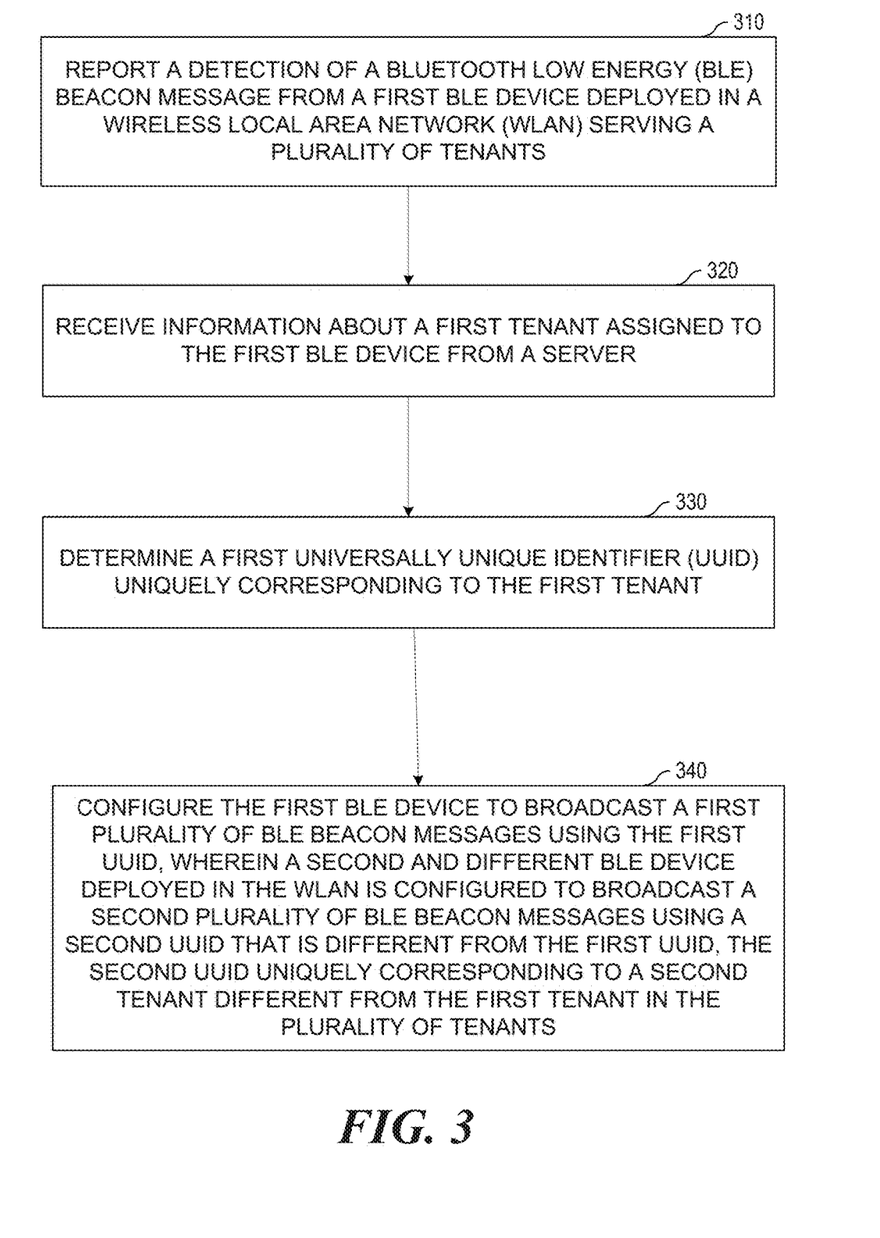
FIG. 3 is a flowchart of an example process of transmitting traffic from BLE clients associated with different universally unique identifiers (UUIDs)

Processes of Transmitting Traffic from BLE Clients Associated with Different UUIDs FIG. 3 is a flowchart of an example process of transmitting traffic from BLE devices associated with different UUIDs. During operations, a network device (e.g., an AP) may report a detection of a Bluetooth Low Energy (BLE) beacon message from a first BLE device deployed in a wireless local area network (WLAN) serving a plurality of tenants (operation 310). Further, the network device may receive information about a first tenant assigned to the first BLE device from a server (operation 320). Then, the network device may determine a first universally unique identifier (UUID) uniquely corresponding to the first tenant (operation 330). Moreover, the network device may configure the first BLE device to broadcast a first plurality of BLE beacon messages using the first UUID. In addition, a second and different BLE device deployed in the WLAN is configured to broadcast a second plurality of BLE beacon messages using a second UUID that is different from the first UUID. Here, the second UUID may uniquely correspond to a second tenant that is different from the first tenant in the plurality of tenants.

In some examples, the server may maintain a floor plan that includes a plurality of BLE devices deployed in the WLAN, whereas a first subset of the plurality of BLE devices located within a first geographical region are assigned to the first tenant, and whereas a second subset of the plurality of BLE devices located within a second geographical region are assigned to the second tenant. In one example, the first subset and the second subset may include non-overlapping BLE devices if the first geographical region and the second geographical region do not overlap with each other. In another example, the first subset and the second subset may include a set of overlapping BLE devices if the first geographical region and the second geographical region overlap with each other. In yet another example, the first subset belongs to the second subset if the first geographical region is located within the second geographical region.

In some examples, the network device may further identify a first network controller that manages a first network associated with the first tenant and a second network controller that manages a second network associated with the second tenant respectively. Further, the network device may establish a first secure tunnel from the network device to the first network controller and a second secure tunnel from the network device to the second network controller respectively. Also, the network device may transmit traffic associated with the first tenant to the first network controller via the first secure tunnel and traffic associated with the second tenant to the second network controller via the second secure tunnel respectively.

In some examples, the network device may configure at least a first VAP and a second VAP, whereas traffic associated with the first tenant is transmitted via the first VAP and traffic associated with the second tenant is transmitted via the second VAP respectively.

In some examples, the network device may determine the first UUID uniquely corresponding to the first tenant by: identifying the first VAP uniquely associated with the first tenant; and retrieving a mapping between the first VAP and the first UUID from a map.

In some examples, the network device may provide location tracking service for a first set of client devices located within a first geographical region and connected to a first secure network managed by a first network controller assigned to the first tenant, but not a second set of client devices located within a second geographical region and connected to a second secure network managed by a second network controller assigned to the second tenant.

In some examples, when a security threat is detected in a first secure network associated with the first tenant, the network device may configure a first set of BLE devices including the first BLE device to stop broadcasting BLE beacon messages containing the first UUID, whereas the first set of BLE devices are assigned to the first tenant.

In some examples, the network device may provide a network service at a first service level to a first plurality of client devices connected to the first BLE device using the first UUID; and provide the network service at a second service level that is different from the first service level to a second plurality of client devices connected to the second BLE device using the second UUID.

Figure 4:
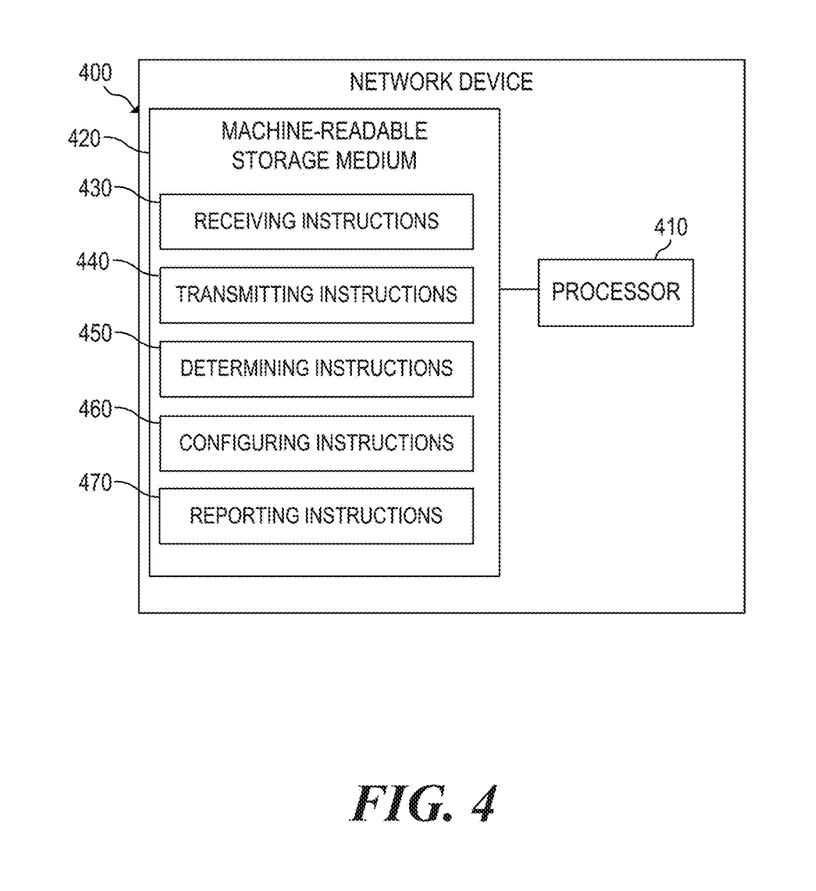
FIG. 4 is a block diagram of an example network device to transmit traffic from BLE clients associated with different UUIDs.

Network Device to Transmit Traffic from BLE Clients Associated with Different UUIDs FIG. 4 is a block diagram of an example network device to transmitting traffic from BLE devices associated with different UUIDs. As used herein, a network device may be implemented, at least in part, by a combination of hardware and programming. For example, the hardware may comprise at least one processor (e.g., processor 410) and the programming may comprise instructions, executable by the processor(s), stored on at least one machine-readable storage medium (e.g., 420). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 410 may fetch, decode, and execute instructions stored on storage medium 420 to perform the functionalities described below in relation to receiving instructions 430, transmitting instructions 440, determining instructions 450, configuring instructions 460, and reporting instructions 470. In other examples, the functionalities of any of the instructions of storage medium 420 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 4, storage medium 420 may be implemented by one machine-readable storage medium, or multiple machine-readable storage media.

Although network device 400 includes at least one processor 410 and machine-readable storage medium 420, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 430-470 may be executed by processor 410 to: report a detection of a Bluetooth Low Energy (BLE) beacon message from a first BLE device deployed in a wireless local area network (WLAN) serving a plurality of tenants; receive information about a first tenant assigned to the first BLE device from a server, determine a first universally unique identifier (UUID) uniquely corresponding to the first tenant; configure the first BLE device to broadcast a first plurality of BLE beacon messages using the first UUID, wherein a second and different BLE device deployed in the WLAN is configured to broadcast a second plurality of BLE beacon messages using a second UUID that is different from the first UUID, the second UUID uniquely corresponding to a second tenant different from the first tenant in the plurality of tenants; maintain a floor plan that includes a plurality of BLE devices deployed in the WLAN, wherein a first subset of the plurality of BLE devices located within a first geographical region are assigned to the first tenant, and wherein a second subset of the plurality of BLE devices located within a second geographical region are assigned to the second tenant; etc.

In addition, instructions 430-470 may be executed by processor 410 further to: identify a first network controller that manages a first network associated with the first tenant and a second network controller that manages a second network associated with the second tenant; establish a first secure tunnel from the network device to the first network controller and a second secure tunnel from the network device to the second network controller respectively; transmit traffic associated with the first tenant to the first network controller via the first secure tunnel and traffic associated with the second tenant to the second network controller via the second secure tunnel respectively; etc.

Moreover, instructions 430-470 may be executed by processor 410 further to: configure at least a first VAP and a second VAP on the network device, wherein traffic associated with the first tenant is transmitted via the first VAP and traffic associated with the second tenant is transmitted via the second VAP; identify the first VAP as being uniquely associated with the first tenant and the second VAP as being uniquely associated with the second tenant; retrieve a mapping between the first VAP and the first UUID from a map; provide location tracking service for a first set of client devices located within a first geographical region and connected to a first secure network managed by a first network controller assigned to the first tenant, but not a second set of client devices located within a second geographical region and connected to a second secure network managed by a second network controller assigned to the second tenant; configure a first set of BLE devices including the first BLE device to stop broadcasting BLE beacon messages containing the first UUID, wherein the first set of BLE devices are assigned to the first tenant in response to a security threat being detected in a first secure network associated with the first tenant; provide a network service at a first service level to a first plurality of client devices connected to the first BLE device using the first UUID; provide the network service at a second service level that is different from the first service level to a second plurality of client devices connected to the second BLE device using the second UUID; etc.

We claim:

1. A method comprising:
reporting, by a network device, a detection of a Bluetooth Low Energy (BLE) beacon message from a first BLE device deployed in a wireless local area network (WLAN) serving a plurality of tenants;
receiving, by the network device, information about a first tenant assigned to the first BLE device from a server;
determining, by the network device, a first universally unique identifier (UUID) uniquely corresponding to the first tenant;
configuring, by the network device, the first BLE device to broadcast a first plurality of BLE beacon messages using the first UUID, wherein a second and different BLE device deployed in the WLAN is configured to broadcast a second plurality of BLE beacon messages using a second UUID that is different from the first UUID, the second UUID uniquely corresponding to a second tenant different from the first tenant in the plurality of tenants;
identifying, by the network device, a first network controller managing a first network associated with the first tenant and a second network controller managing a second network associated with the second tenant;
establishing, by the network device, a first secure tunnel from the network device to the first network controller and a second secure tunnel from the network device to the second network controller; and
transmitting, by the network device, traffic associated with the first tenant to the first network controller via the first secure tunnel and traffic associated with the second tenant to the second network controller via the second secure tunnel.

2. The method of claim 1,
wherein the server maintains a floor plan that includes a plurality of BLE devices deployed in the WLAN,
wherein a first subset of the plurality of BLE devices located within a first geographical region are assigned to the first tenant, and wherein a second subset of the plurality of BLE devices located within a second geographical region are assigned to the second tenant.

3. The method of claim 2, wherein the first subset and the second subset include non-overlapping BLE devices in response to the first geographical region and the second geographical region not overlapping with each other.

4. The method of claim 2, wherein the first subset and the second subset include a set of overlapping BLE devices in response to the first geographical region and the second geographical region overlapping with each other.

5. The method of claim 2, wherein the first subset belongs to the second subset in response to the first geographical region being located within the second geographical region.

6. The method of claim 1, further comprising:
configuring, on the network device, at least a first virtual access point (VAP) and a second VAP, wherein traffic associated with the first tenant is transmitted via the first VAP and traffic associated with the second tenant is transmitted via the second VAP.

7. The method of claim 6, wherein determining the first UUID uniquely corresponding to the first tenant further comprises:
identifying, by the network device, the first VAP uniquely associated with the first tenant; and
retrieving, by the network device, a mapping between the first VAP and the first UUID from a map.

8. The method of claim 1, further comprising:
providing location tracking service for a first set of client devices located within a first geographical region and connected to a first secure network managed by a first network controller assigned to the first tenant, but not a second set of client devices located within a second geographical region and connected to a second secure network managed by a second network controller assigned to the second tenant.

9. The method of claim 1, further comprising:
in response to a security threat being detected in a first secure network associated with the first tenant, configure a first set of BLE devices including the first BLE device to stop broadcasting BLE beacon messages containing the first UUID, wherein the first set of BLE devices are assigned to the first tenant.

10. A network device, comprising at least:
a memory;
a processor executing instructions from the memory to:
report a detection of a Bluetooth Low Energy (BLE) beacon message from a first BLE device deployed in a wireless local area network (WLAN) serving a plurality of tenants;
receive information about a first tenant assigned to the first BLE device from a server;
determine a first universally unique identifier (UUID) uniquely corresponding to the first tenant;
configure the first BLE device to broadcast a first plurality of BLE beacon messages using the first UUID, wherein a second and different BLE device deployed in the WLAN is configured to broadcast a second plurality of BLE beacon messages using a second UUID that is different from the first UUID, the second UUID uniquely corresponding to a second tenant different from the first tenant in the plurality of tenants;
identify a first network controller managing a first network associated with the first tenant and a second network controller managing a second network associated with the second tenant;
establish a first secure tunnel from the network device to the first network controller and a second secure tunnel from the network device to the second network controller; and
transmit traffic associated with the first tenant to the first network controller via the first secure tunnel and traffic associated with the second tenant to the second network controller via the second secure tunnel.

11. The network device of claim 10,
wherein the server maintains a floor plan that includes a plurality of BLE devices deployed in the WLAN,
wherein a first subset of the plurality of BLE devices located within a first geographical region are assigned to the first tenant, and
wherein a second subset of the plurality of BLE devices located within a second geographical region are assigned to the second tenant.

12. The network device of claim 11, wherein the first subset and the second subset include either (1) a set of non-overlapping BLE devices in response to the first geographical region and the second geographical region not overlapping with each other, or (2) a set of overlapping BLE devices in response to the first geographical region and the second geographical region overlapping with each other.

13. The network device of claim 11, wherein the first subset belongs to the second subset in response to the first geographical region being located within the second geographical region.

14. The network device of claim 10, wherein the processor executes the instructions from the memory further to:
identify a first virtual access point (VAP) as being uniquely associated with the first tenant;
retrieve a mapping between the first VAP and the first UUID; and
configure at least the first VAP and a second VAP, wherein traffic associated with the first tenant is transmitted via the first VAP and traffic associated with the second tenant is transmitted via the second VAP.

15. The network device of claim 10, wherein the processor executes the instructions from the memory further to:
provide a network service at a first service level to a first plurality of client devices connected to the first BLE device using the first UUID; and
provide the network service at a second service level that is different from the first service level to a second plurality of client devices connected to the second BLE device using the second UUID.

16. A non-transitory machine-readable storage medium encoded with instructions executable by at least one processor of a network device, the machine-readable storage medium comprising instructions to:
receive information about a first tenant assigned to the first BLE device from a server;
determine a first universally unique identifier (UUID) uniquely corresponding to the first tenant;
configure the first BLE device to broadcast a first plurality of BLE beacon messages using the first UUID, wherein a second and different BLE device deployed in the WLAN is configured to broadcast a second plurality of BLE beacon messages using a second UUID that is different from the first UUID, the second UUID uniquely corresponding to a second tenant different from the first tenant in the plurality of tenants;
identify a first network controller managing a first network associated with the first tenant and a second network controller managing a second network associated with the second tenant;

establish a first secure tunnel from the network device to the first network controller and a second secure tunnel from the network device to the second network controller; and transmit traffic associated with the first tenant to the first network controller via the first secure tunnel and traffic associated with the second tenant to the second network controller via the second secure tunnel.

17. The non-transitory machine-readable storage medium of claim 16, wherein the server maintains a floor plan that includes a plurality of BLE devices deployed in the WLAN, wherein a first subset of the plurality of BLE devices located within a first geographical region are assigned to the first tenant, and wherein a second subset of the plurality of BLE devices located within a second geographical region are assigned to the second tenant.

18. The non-transitory machine-readable storage medium of claim 16, further comprising instructions to:

identify a first virtual access point (VAP) as being uniquely associated with the first tenant and a second VAP as being uniquely associated with the second tenant respectively, wherein traffic associated with the first tenant is transmitted via the first VAP and traffic associated with the second tenant is transmitted via the second VAP respectively; and establish the first secure tunnel from the first VAP to the first network controller and the second secure tunnel from the second VAP to the second network controller respectively.

* * * * *